(12) United States Patent
Gupta et al.

(10) Patent No.: US 11,899,698 B2
(45) Date of Patent: Feb. 13, 2024

(54) WORDBREAK ALGORITHM WITH OFFSET MAPPING

(71) Applicant: Microsoft Technology Licensing, LLC, Redmond, WA (US)

(72) Inventors: Manoj Gupta, Hyderabad (IN); Kavin Motlani, Indore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 17/444,347

(22) Filed: Aug. 3, 2021

(65) Prior Publication Data

US 2022/0382789 A1 Dec. 1, 2022

(30) Foreign Application Priority Data

May 28, 2021 (IN) .............................. 202141023933

(51) Int. Cl.
*G06F 16/31* (2019.01)
(52) U.S. Cl.
CPC .................................. *G06F 16/313* (2019.01)
(58) Field of Classification Search
CPC .................................................... G06F 16/313
USPC .......................................................... 707/741
See application file for complete search history.

(56) References Cited

U.S. PATENT DOCUMENTS

| | | | | |
|---|---|---|---|---|
| 2002/0143521 A1* | 10/2002 | Call | ...................... | G06F 40/143 704/1 |
| 2016/0092557 A1* | 3/2016 | Stojanovic | ............ | G06F 16/248 707/723 |
| 2018/0113906 A1* | 4/2018 | Gulwani | ........... | G06F 16/24544 |
| 2019/0286702 A1* | 9/2019 | Kataoka | ................ | G06F 40/129 |
| 2020/0334381 A1 | 10/2020 | Yarowsky et al. | | |

FOREIGN PATENT DOCUMENTS

EP 0907924 A1 4/1999

OTHER PUBLICATIONS

"Adjust text spacing and line breaks in form templates that contain both East Asian and Latin text", Retrieved from: https://support.microsoft.com/en-us/office/adjust-text-spacing-and-line-breaks-in-form-templates-that-contain-both-east-asian-and-latin-text-4f6d3705-6197-4e8f-b106-83b6eca91cd5, Retrieved Date: Nov. 2, 2020, 8 Pages.

(Continued)

*Primary Examiner* — Kimberly L Wilson
(74) *Attorney, Agent, or Firm* — Alleman Hall & Tuttle LLP (57) ABSTRACT

A computer system is provided, including a processor coupled to a mass storage device that stores instructions, which, upon execution by the processor, cause the processor to store an original string formed of a plurality of characters, perform a wordbreak algorithm on the original string, and tokenize the original string to generate a processed string including a plurality of word tokens separated by spaces. The processor is further configured to generate an offset map between locations within the word tokens in the processed string and corresponding locations in the original string and classify a portion of the processed string as a target. The processor is further configured to identify target characters in the original string that correspond to the target using the offset map and perform a predetermined action on the target characters in the original string.

20 Claims, 8 Drawing Sheets

(56) References Cited

OTHER PUBLICATIONS

"Chinese character encoding", Retrieved from: https://en.wikipedia.org/wiki/Chinese_character_encoding, Aug. 11, 2020, 4 Pages.

"Create a Syntax Token for Asian Languages", Retrieved from: https://www.ibm.com/docs/en/b2b-integrator/5.2?topic=usf-create-syntax-token-asian-languages, Retrieved Date: Nov. 2, 2020, 3 Pages.

"Help me highlight Asian characters in MS Word?", Retrieved from: https://ask.metafilter.com/218621/Help-me-highlight-Asian-characters-in-MS-Word, Jun. 26, 2012, 5 Pages.

"New way of tokenization of Chinese", Retrieved from: https://manticoresearch.com/2019/07/17/new-way-of-tokenization-of-chinese/, Jul. 17, 2019, 10 Pages.

Bercovitz, Benjamin, "Chinese Sentence Tokenization Using a Word Classifier", Retrieved from: http://cs229.stanford.edu/proj2009/Bercovitz.pdf, Sep. 10, 2015, 5 Pages.

Kinsman, et al., "Search", Retrieved from: https://docs.microsoft.com/en-us/dax/search-function-dax, Jul. 10, 2020, 4 Pages.

Lunde, Ken, "Unicode® Standard Annex #11", In Technical report of unicode, Jan. 18, 2020, 11 Pages.

Olinsky, et al., "Non-Standard Word and Homograph Resolution for Asian Language Text Analysis", In Proceedings of Sixth international conference on spoken language processing, Oct. 16, 2000, 4 Pages.

Sharkey, et al., "Find", Retrieved from: https://docs.microsoft.com/en-us/dax/find-function-dax, Dec. 10, 2018, 3 Pages.

Whistler, Ken, "Unicode Normalization Forms", In Technical report of Unicode, Feb. 24, 2020, 40 Pages.

"Fine-tuning with custom datasets—transformers 4.0.0 documentation", Retrieved From: https://web.archive.org/web/20201203012957/https://huggingface.co/transformers/custom_datasets.html, Dec. 3, 2020, 13 Pages.

"International Search Report and Written Opinion Issued in PCT Patent Application No. PCT/IB22/000257", dated Oct. 17, 2022, 11 Pages.

\* cited by examiner

COMPLIANCE AND
SECURITY PROGRAM 92

COMPLIANCE AND SECURITY PROGRAM GUI 96

SENSITIVE DATA DEFINITION 94

SENSITIVE DATA TYPES

☐ PASSPORT NUMBER
☐ SOCIAL SECURITY NUMBER
☐ DRIVER'S LICENSE NUMBER
☐ SOCIAL SECURITY NUMBER
☐ CREDIT CARD NUMBER

ADD OR DELETE FROM
ACTIVE SENSITIVE
DATA DEFINITION

[ ADD ] [ CANCEL ]

POLICIES 96

LOCATIONS

☐ MAIL SERVER
☐ CLOUD STORAGE
☐ FILE SERVER

PATH

ACTIONS

☐ DISPLAY TARGET WITH EMPHASIS
☐ OBFUSCAATE TARGET
☐ EXTRACT TARGET
☐ DISPLAY WANING MESSAGE

[ ADD ] [ CANCEL ]

ORIGINAL STRING 34

0 1 2 3 4 5 6 7 8 9 10 11 12 13 14 15 16 17 18 19 20 21 22 23 24 25 26 27 28 29 30 31 32 33 34 35 36 37 38 39 40
購入履歴はまもなくログインして初めて利用可能になり、マイナンバーカード内で集中管理されます

PROCESSED STRING 36

TARGET 56

購入 履歴 は まもなく ログイン し て 初めて 利用 可能 に なり マイ ナンバーカード 内 で 集中 管理 さ れ ます
                                                              42                    52

50 — FIRST DATA STRUCTURE OF OFFSET MAP
OriginalStringTokenInfo (start, length): [0](0, 2), [1](2, 2), [2](4, 1), [3](5, 4), [4](9, 4), [5](13, 1), [6](14, 1), [7](15, 2), [8](17, 1), [9](18, 2),
[10](20, 2), [11](22, 1), [12](23, 2), [13](26, 2), [14](28, 7), [15](35, 1), [16](36, 1), [17](37, 2), [18](39, 2), [19](41, 1), [20](42, 1), [21](43, 2)

52 — SECOND DATA STRUCTURE OF OFFSET MAP
ProcessedTokenInfo (end offset): [0](3), [1](6), [2](8), [3](13), [4](18), [5](20), [6](22), [7](25), [8](27), [9](30), [10](33), [11](35),
[12](38), [13](41), [14](49), [15](51), [16](53), [17](56), [18](59), [19](61), [20](63), [21](66)

83 — 1ST FORMULA: ProcessedTokenInfo[i] = ProcessedTokenInfo[i-1] + OriginalStringTokenInfo[i].LENGTH + LENGTH OF SPACE(1)

56A        ナンバーカード 内 で       56B
                                                                                                              = (42, 52)
58 — TARGET WORD TOKENS (START, END) IN PROCESSED STRING: ProcessedTokenInfo[i-1] ≤ TARGET(START) < ProcessedTokenInfo[i]
                                                          ProcessedTokenInfo[i-1] < TARGET(END) ≤ ProcessedTokenInfo[i]

84 — 2ND FORMULA FOR START/END TOKENINDEX i :
    TokenIndex i for START: 14    [13]41 ≤ 42 < [14]49  i=14
    TokenIndex i for END:16       [15]51 < 52 ≤ 16]53   i=16

86 — 3RD FORMULA FOR MAPPING TO ORIGINAL STRING
(OriginalStringTokenInfo[StartTokenIndex].Start, OriginalStringTokenInfo[EndTokenIndex].Start + OriginalStringTokenInfo[EndTokenIndex].length − 1)
= (OriginalStringTokenInfo[4].Start, OriginalStringTokenInfo[5].Start + OriginalStringTokenInfo[5].length − 1)
= (28, 36 + 1 − 1)
= (28, 36)
= ナンバーカード内で

WORDBREAK ALGORITHM WITH OFFSET MAPPING

BACKGROUND

Wordbreak algorithms are used in a variety of contexts in computing. One specific application in which wordbreak algorithms are employed is in Data Loss Prevention (DLP). DLP systems are designed to protect against threats of data loss, such as theft and accidental disclosure, when storing or transmitting sensitive data such computers and computer networks. For example, word classification programs can be used by such DLP systems to monitor and detect sensitive information included in electric communications such as email and messaging to prevent sensitive information from being sent outside a corporate network. DLP technologies support multi-byte characters included in languages such as Chinese, Korean, and Japanese. For strings of those multi-byte characters, wordbreak algorithms may be used to break original strings of characters into discrete words, typically separated by spaces, and generate processed strings including tokenized words.

For those multi-byte languages, however, the processed string generated by the wordbreak algorithm in many situations may have a different length than the original string, and may also lose some characters that are present in the original string such as commas and punctuation marks, and may also have spaces, tabs, and other space characters that are different from the original string. When there are inconsistencies between the original string and processed string such as these, word classification programs in DLP systems may not identify sensitive information in the original string correctly and this may lead to theft or accidental disclosure of critical sensitive information.

SUMMARY

According to one aspect of the present disclosure, a computer system is provided, including a processor coupled to a mass storage device that stores instructions. Upon execution by the processor, the instructions cause the processor to store an original string formed of a plurality of characters, perform a wordbreak algorithm on the original string, and tokenize the original string to generate a processed string including a plurality of word tokens separated by spaces. The processor may be further configured to generate an offset map between locations within the word tokens in the processed string and corresponding locations in the original string, classify a portion of the processed string as a target, identify target characters in the original string that correspond to the target using the offset map, and perform a predetermined action on the target characters in the original string.

One potential advantage of this configuration is that the wordbreak algorithm can identify target characters in the original string formed with multi-byte language characters based on the processed string correctly, even if there are inconsistencies between the original string and processed string. As a result, a word classification program employing such an algorithm can identify sensitive information correctly and inhibit theft or accidental disclosure of the information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a schematic view of a plurality of data structures manipulated by the computing system of FIG. 1, when performing a wordbreak algorithm with offset mapping on a different example of an original string.

DETAILED DESCRIPTION

As discussed above, wordbreak algorithms are useful to a variety of software applications, including DLP systems that are used to monitor and detect sensitive information in various languages, as discussed above. Wordbreak algorithms are also used in search programs such as search engines and indexing programs that run on modern personal computers and servers. In these search programs, the wordbreak algorithm is used to process a data set of strings into a data set of processed strings including tokenized words. Once a match is found by the search program, the match in the data set may be displayed in highlighted form for the user to see, may be extracted from the data set, or may be obfuscated, for example. To take such action, it will be appreciated that the wordbreak algorithm determines where the search program identified word tokens in the tokenized processed string, and determines where the matching word tokens correspond to characters in the original string, since the word tokens differ slightly from the characters original string. This can be a challenging task, as discussed below.

Languages such as English, French, and Spanish have spaces between words as word boundaries. For those languages, the word boundaries of a processed string output by a word classification program are in line with the word boundaries of an original string. Thus, a search program conducting a search on a data set of strings that include spaces separating the words, identifying the locations of the corresponding words in the original string is relatively easy.

Multi-byte encoded languages such as Chinese, Korean, and Japanese, however, do not have space denominated word boundaries. Were a conventional wordbreak algorithm applied to an original string of a multi-byte encoded language such as these, it would produce a processed string with word boundaries. However, the processed string generated by the wordbreak algorithm in many situations may have a different length than the original string because of the added spaces to separate word tokens. The processed string may also lose some characters that are present in the original string such as comma and punctuation marks, and may also have spaces, tabs, and other space characters that are different from the original string. When there are inconsistencies between the original string and processed string such as these, the search program may not identify characters in the original string that correspond to matched word tokens in the processed string correctly.

Figure 1:
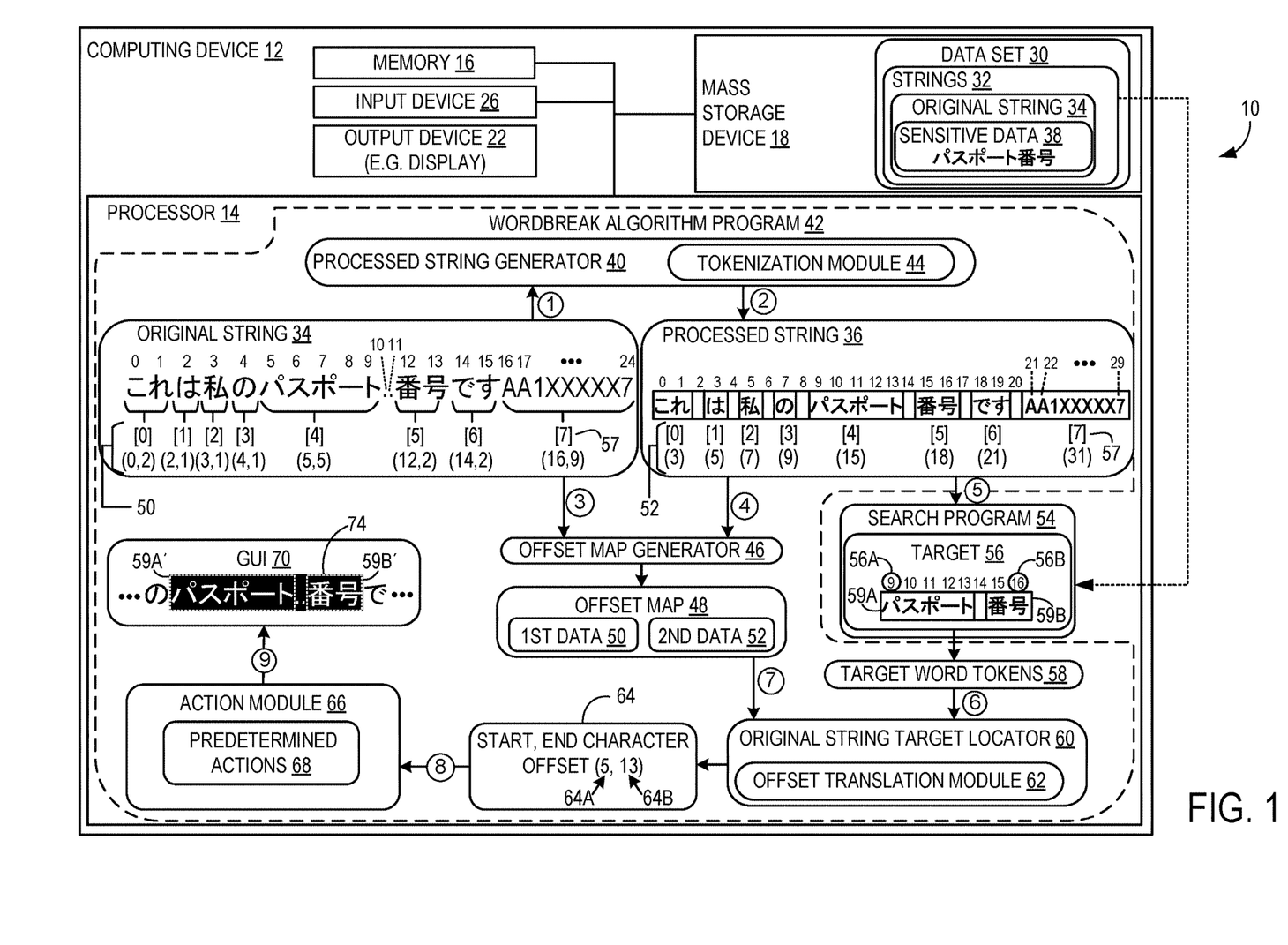
FIG. 1 shows a schematic view of a computing system including a computing device that is configured to perform a wordbreak algorithm to generate a processed string that can be searched by a search program, and when a match is found by the search program, to identify target characters in an original string corresponding to a matched target in the processed string, utilizing an offset map.

To address these issues, a computer system and computerized method for use therewith are disclosed herein. FIG. 1 shows a computing system 10 including a computing device 12 that is configured to perform a wordbreak algorithm program 42 to generate a processed string 36 that can be searched by a search program 54, and when a match is found by the search program 54, to identify target characters 74 in an original string 34 corresponding to a matched target in the processed string 36, utilizing an offset map 48, according to one aspect of the present disclosure. In the depicted configuration, the computing device 12 may include a processor 14, memory 16, and mass storage device 18, which may be operatively coupled to each other by a communications bus. The processor 14, memory 16, and mass storage 18 may each be configured as one or more physical components such as one or more processor cores and/or one or more physical memory modules. The mass storage device 18 stores the instructions for the various software components described herein as being executed by processor 14 and also stores data set 30 used by those software components. The computing device 12 may further include an input device 26, which may be a keyboard, a mouse, a touchscreen, a trackpad, an accelerometer, a microphone, or some other suitable type of input device. In addition, the computing device 12 may further include an output device 22, which may be a display, a speaker, or some other suitable type of output device. The computing device 12 may be any type of a variety of types of computing devices, such as a laptop, desktop, or server. The computing device 12 may also be a mobile computing device such as a handheld tablet or smartphone device.

Figure 2:
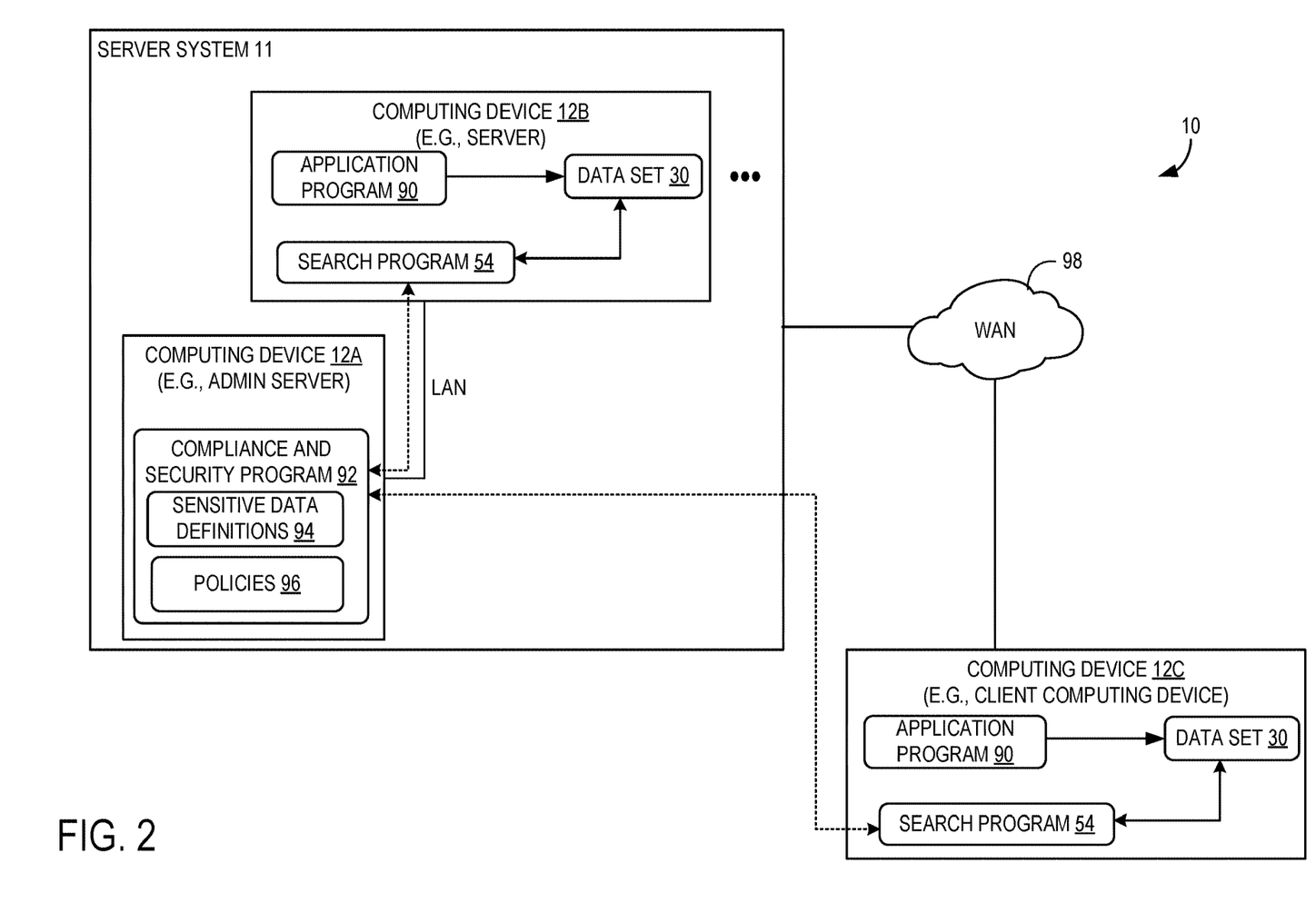
FIG. 2 shows a schematic view of another configuration of the computing system of FIG. 1, which includes a server system including a first computing device configured with a compliance and security program that sets policies and sensitive data definitions, and a second computing device and a third computing device, each of which execute a search program according to the definitions and policies set by the first computing device.

Upon execution by the processor 14, the instructions stored in the mass storage device 18 cause the processor 14 to store an original string 34 formed of a plurality of characters. This may occur, for example, when an indexing program indexes the files on a user's hard drive, when a server crawls the web and stores a collection of indexed files gathered from the web, when a software program stores records in a database, or when a software program stores working data for a communication such as email or chat message or for document. In the following illustrative example, a user is communicating with a travel agent about the user's passport number for a business trip, and the communication is flagged by a security policy set by the user's organization, as shown in FIG. 2. It will be appreciated that the original string 34 may be one of tens, hundreds, thousands, or even millions of original strings stored on mass storage device 18, depending on the application. In the depicted configuration in FIG. 1, the stored original string 34 is formed with Japanese characters that translate to "This is my passport . . . number AA1XXXXXX7". The original string 34 written in Japanese has no space between words, since the Japanese language does not use spaces to denominate words. The original string 34 may be extracted from or contained within an electronic document or an electronic message, such as an email or word processing document that the user is sending to the travel agent in the illustrated example. The mass storage device 18 may further store sensitive data 38 as part of the original string 34. The definitions for sensitive data 38 and policies to handle sensitive data 38 may be defined by a user or administrator, as will be described below with reference to FIG. 2. In the depicted example in FIG. 1, the sensitive data 38 includes "passport number" in Japanese. It will be appreciated that the original string 34 may be formed with other multi-byte encoded languages such as Chinese, Korean, and Thai.

Following storage of the original string 34, a process flow generally proceeding from (1) to (9) as illustrated in FIG. 1 is followed. At (1) and (2), a wordbreak algorithm program 42 of the system 10 receives as input the stored original string 34 and outputs a processed string 36. The processor 14 is configured to perform a wordbreak algorithm via the wordbreak algorithm program 42. The wordbreak algorithm program 42 may include a processed string generator 40 having a tokenization module 44 that is configured to perform the wordbreak algorithm on the original string 34 and tokenize the original string 34 to generate a processed string 36 including a plurality of word tokens separated by spaces. It will be appreciated that tokenization of the original string 34 via the tokenization module 44 generates the processed string 36 as its output. Thus, generation of the processed string occurs through tokenization. Differences between the original string 34 and processed string 36 are described in detail below. In this example, the original string 34 is written in Japanese, and an English translation of the original string is "This is my passport . . . number AA1XXXXXX7." In Japanese, this original string 34 has twenty-four characters. In the depicted example, the processed string 36 produced by the processed string generator 40 of the wordbreak algorithm program 42 includes word tokens separated by seven spaces, and the two dots at the $10^{th}$ and $11^{th}$ locations in the original string 34 are removed, and thus the two dots are omitted in the processed string 36 after performing the wordbreak algorithm. As a result, the processed string 36 has twenty-nine characters including the spaces, as depicted in FIG. 1.

As discussed above, the processed string 36 is in a form that is compatible with search program 54, and is thus efficient to search. For example, the processed string 36 may be indexed data in a searchable index created from one of the sources for data set 30 described above, etc. Thus, while processed string 36 is easy to search, it is not in a natural form suitable for consumption by the user. For this reason, in order to display to the user a target 56 that is found in the processed string 36 using portions of the original string 34, an offset map 48 is generated.

Specifically, as shown at (3) and (4), an offset map 48 between locations within the word tokens in the processed string 36 and corresponding locations in the original string 34 may be generated via an offset map generator 46. The offset map 48 may include a first data structure 50 and a second data structure 52 that are created based on the original string 34 and processed string 36. The first data structure 50 includes a start character offset index value and character length in the original string 34, of each token word that is detected in the original string 34 during the wordbreak algorithm, and the second data structure 52 includes an end character offset index value of each token in the processed string 36, and each of the first and second data structures has a same number of elements, that is, each stores a same number of token index values 57, although with corresponding data (start character offset index value and character length OR end character offset index value) for each. As further described in FIG. 3 below, the offset map generator 46 obtains the first data structure 50 of [0](0, 2), [1](2, 1), [2](3, 1) . . . [6](14, 2) and [7](16, 9) from the original string 34, and obtains the second data structure 52 of [0](3), [1](5), [2](7) . . . [6](21) and [7](31) from the processed string 36.

At (5) and (6), the processor 14 may be further configured to detect and classify a portion of the processed string 36 as a target 56 via a search program 54. The target 56 is sensitive information of a predetermined sensitive information data type defined by a user or administrator, as described in FIG. 2 below. The search program 54 searches the processed string 36 for the sensitive data 38 and locates the target 56, which corresponds to characters included in the sensitive data 38 and thus matching a sensitive data definition 94 (see FIG. 2) set by an administrator or user, for example. In the depicted example, "passport number" in Japanese is included in the sensitive data 38, and the target 56 "passport number" in Japanese in the processed string 36 is located via the search program 54. The search program 54 obtains and sends target word tokens 58 of the target 56 and/or associated start character offset index value 56A and end character offset index value 56B to an original string target locator 60.

In the depicted example, the target word tokens 58 ("passport number") and the start character offset index value 56A ("9" in FIG. 1) and end character offset index value 56B ("16" in FIG. 1) for "passport number" of the processed string 36 are sent to the original string target locator 60.

At (7) and (8), the processor may be further configured to identify target characters 74 in the original string 34 that correspond to the target 56 using the offset map 48 and the target word tokens 58 and/or associated start character offset index value 56A and end character offset index value 56B provided by the search program 54. The target characters 74 in the original string 34 may be located by identifying a start character offset index value 64A and character length of the target characters 74; and/or identifying the start character offset index value 64A and an end character offset index value 64B of the target characters 74. As further described in FIG. 3 below, an offset translation module 62 of the original string target locator 60 of the wordbreak algorithm program 42 converts the target word tokens 58 and associated start character offset index value 56A and end character offset index value 56B ("9" and "16" in FIG. 1) to the start character offset index value 64A and end character offset index value 64B of the target characters 74 of the original string 34 using the first data structure 50 and the second data structure 52 of the offset map 48. Then, the original string target locator 60 sends the start character offset index value 64A and end character offset index value 64B of the target characters 74 in the original string 34 to an action module 66 of the wordbreak algorithm program 42. In the depicted example, the original string target locator 60 converts the start character offset index value 56A ("9") and end character offset index value 56B ("16") of the target word tokens to (5, 13) as the start character offset index value 64A and the end character offset index value 64B of the original string 34 using the offset map 48 so that the action module 66 is able to identify the target characters 74 "passport . . . number" (English translation of the Japanese target characters) in the original string 34.

At (9), the processor 14 may be further configured to perform a predetermined action on the target characters 74 in the original string 34 via the action module 66 of the wordbreak algorithm program 42. The action module 66 identifies the target characters 74 of the original string 34 based on the start character offset index value 64A and end character offset index value 64B of the target characters 74 and performs predetermined actions 68 on the target characters 74. In this example, the action module 66 identifies and displays the target characters 74 "passport . . . number" with a highlighted emphasis on GUI 70. Turning briefly to FIGS. 5A, 5B, 5C, and 5D, different actions may be programmed by a user or administrator and performed on the target characters 74. In a first configuration shown in FIG. 5A, the target characters 74 may be displayed with emphasis, for example highlighting, underlining, bold characters, italic characters, altered color, larger or smaller font size, etc. In a second configuration shown in FIG. 5B, the target characters 74 may be obfuscated or deleted. In a third configuration shown in FIG. 5C, a warning message regarding the target characters 74 may be displayed. In a fourth configuration shown in FIG. 5D, the target characters 74 may be extracted. Because of these actions executed by the action module 56 of the wordbreak algorithm program 42, in the illustrative example, the user may be prevented from sharing the user's sensitive data 38.

FIG. 2 shows a schematic view of another configuration of the computing system 10 of FIG. 1, which includes a server system 11 and a plurality of computing devices 12A-12C. The computing devices 12A-12C are configured similarly to computing device 12 described above, except as described differently below. It will be appreciated that computing device 12B and 12A are shown to be in a same server system 11, e.g., in a same data center, and thus are connected by a local area network for high-speed communication, while computing device 12C communicates with the server system 11 via WAN 98 such as the Internet. In this way, an administrative user may control security policies for computers both within the data center and across the Internet.

Server system 11 includes a first computing device 12A acting in the role of an administrative server configured with a compliance and security program that sets sensitive data definitions 94 and policies 96, and a second computing device 12B and third computing device 12C, each of which execute a search program 54 according to the definitions 94 and policies 96 set by the first computing device 12A. The computing devices 12B and 12C of the server system 11 are each configured to execute a respective instance of the search program 54, and each instance is configured to receive as input sensitive data definitions 94 and one or more policies 96 from the computing device 12A acting in the role of administration server, and to search a data set including a plurality of original strings for sensitive data according to the sensitive data definitions that is stored on each respective computing device 12B, 12C. Further, although not shown, it will be appreciated that computing device 12A may also implement a search program on a data set to which computing device 12A has access.

Figure 4:
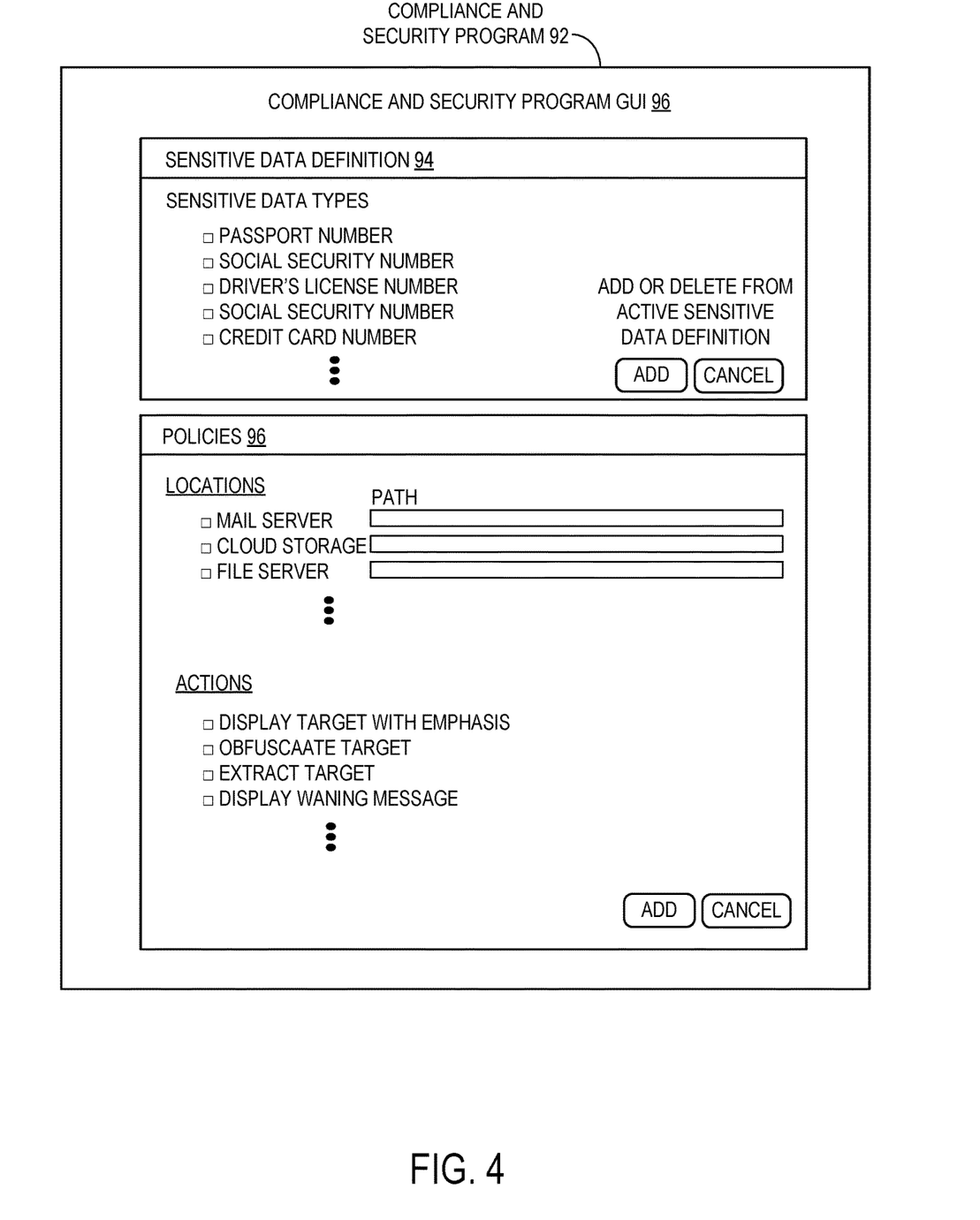
FIG. 4 shows a schematic view of an example GUI utilized in setting compliance and security program policies of FIG. 2.
Figure 5A:
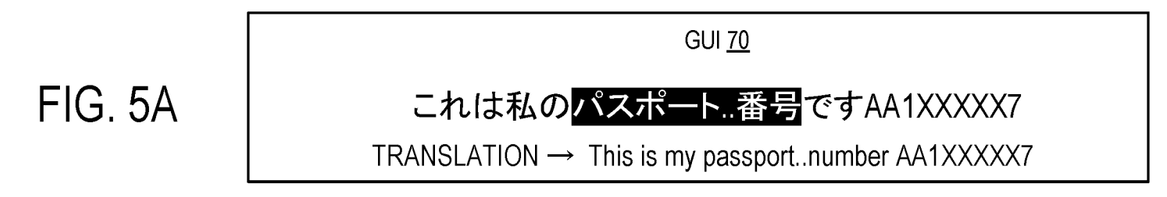
FIGS. 5A-5D illustrate four different GUI examples utilized in performing a predetermined action on the target characters in the original string.
Figure 5B:
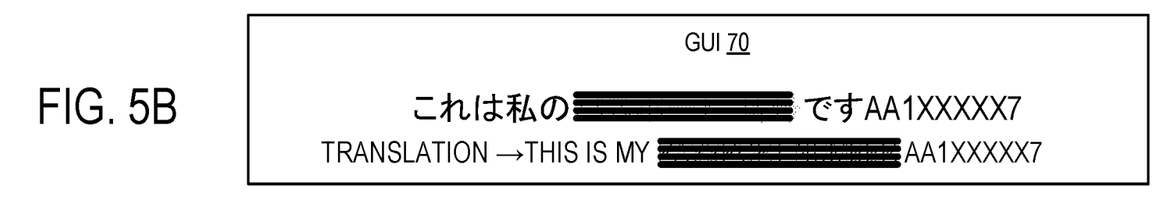
Figure 5C:
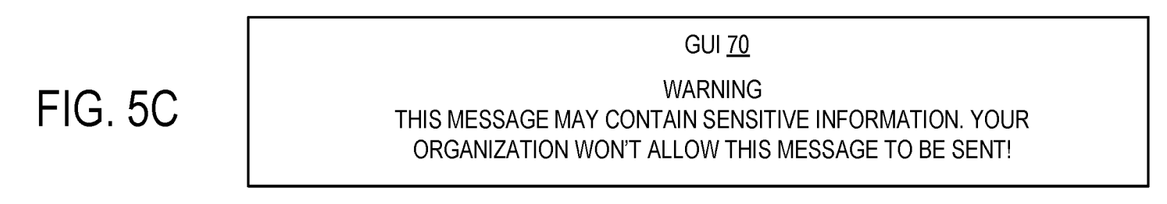
Figure 5D:
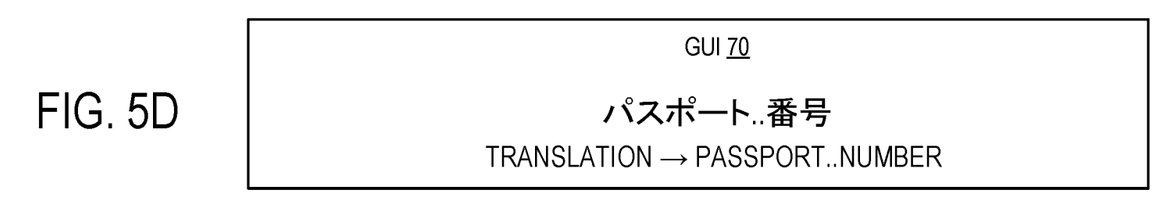

To accomplish this, a compliance and security program 92 may be run by a user or administrator at the computing device 12A to set definitions for sensitive data 94 and policies 96 to handle sensitive data within an organization. Turning briefly to FIG. 4, the user or administrator may create and edit the sensitive data definitions 94 and policies 96 on a compliance and security program GUI 96 of the compliance and security program 92. In the depicted example, the user or administrator may add sensitive data types such as a passport number, social security number and credit card number to the sensitive data definition 94 to the active sensitive data definition 94 that is being applied according to policies 96. Under the policies 96, the user or administrator may set locations to be searched by the search program 54, including a mail server, cloud storage and file server, and may indicate a data path for each resource. The user or administrator may further set predetermined actions on the target characters 74 of the original string 34, as described in FIGS. 5A-5D above.

Figure 3:
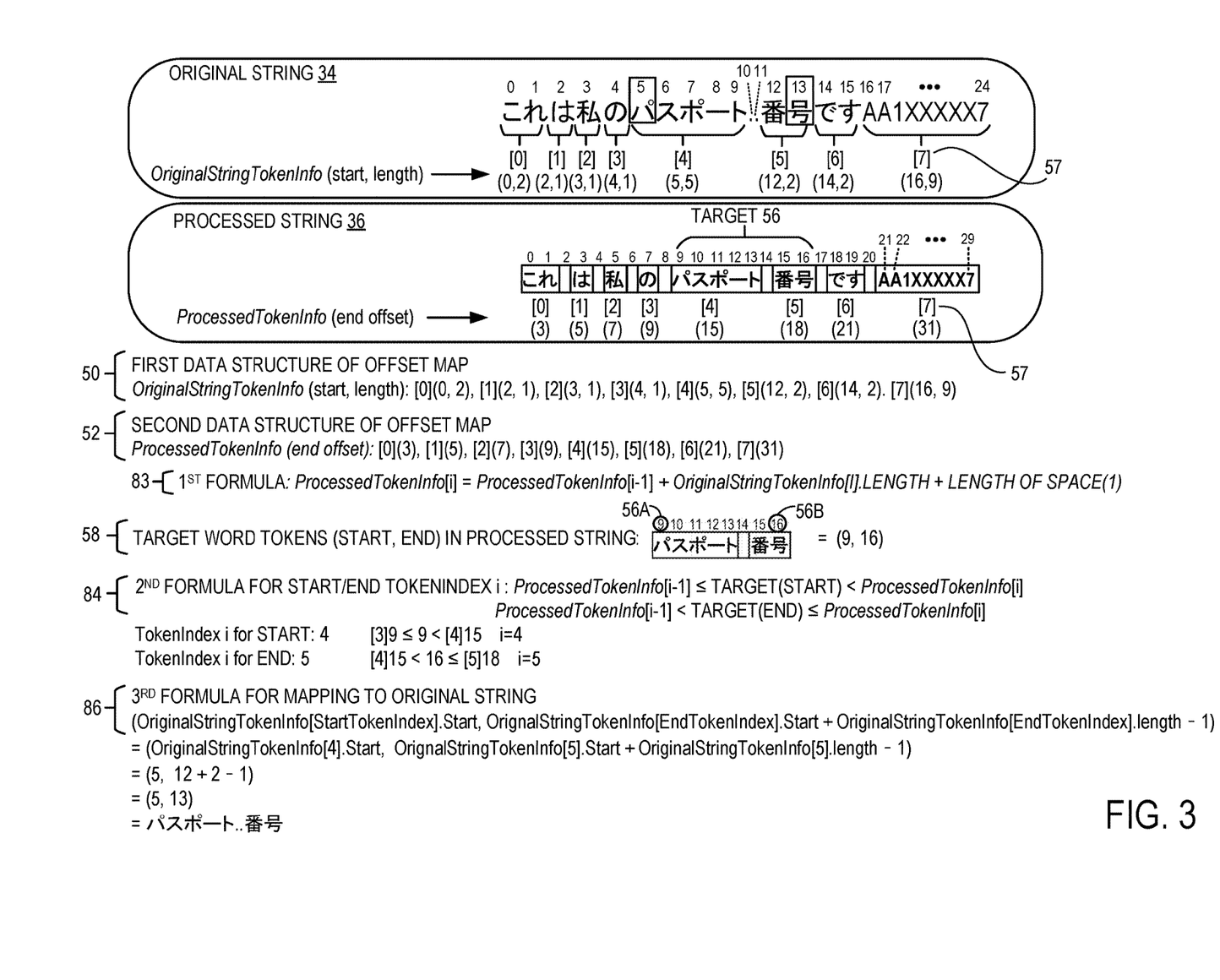
FIG. 3 shows a schematic view of a plurality of data structures manipulated by the computing system of FIG. 1, when performing a wordbreak algorithm with offset mapping.

FIG. 3 shows a schematic view of a plurality of data structures manipulated by the computing system of FIG. 1, when performing the wordbreak algorithm with offset mapping. In the depicted example as described in FIG. 1 above, the offset map generator 46 obtains the first data structure 50 of [0](0, 2), [1](2, 1), [2](3, 1) ... [6](14, 2) and [7](16, 9) from the original string 34, and obtains the second data structure 52 of [0](3), [1](5), [2](7) [6](21) and [7](31) from the processed string 36 to generate the offset map 48. The first data structure 50 stores a start character offset index value and character length in the original string 34, of each token word that is detected in the original string 34 during the wordbreak algorithm. In this example, since the first word starts at "0" and has two characters, the start character offset index value and character length for the first token [0] are (0, 2). Since the next word starts at "2" and has one character, the start character offset index value and character length for the second token [1] are (2, 1). The start character offset index value and character length for the last token [7] are (16, 9). The start character offset index value and character length for the rest of token words are obtained in the same manner.

On the other hand, the second data structure 52 stores an end character offset index value of each token in the processed string 36, which may be obtained using a first formula 83 of FIG. 3. The end character offset index value of the first token [0] is "(3)" following the first formula 83 ("0+2+1=3"), since the prior end character offset index value is "0" and the length for the first token word of the original string is "2" as calculated above and the length of added space is 1. Then, the end character offset index value of the second token [1] is "(5)" following the first formula 83 ("3+1+1=5"), since the prior end character offset index value is "3" and the length for the second token word of the original string is "1" and the length of added space is 1. The end character offset index value of the last token [7] is "(31)" following the first formula 83 ("21+9+1=31"), since the prior end character offset index value is "21" and the length for the second token word of the original string is "9" and the length of added space is 1. The end character offset index value of the rest of token words of the processed sting 36 are obtained in the same manner. Here, each of the first and second data structures 50 and 52 has a same number of elements, that is, each stores a same number of token index values 57, although with corresponding data (start character offset index value and character length OR end character offset index value) for each.

The search program 54 of FIG. 1 identifies the target 56 in the processed string 36 and the target word tokens 58 are determined. The target word tokens 58 each have an associated token index value 57 indicated in brackets. The target word tokens 58 also have an associated start character offset index value 56A and end character offset index value 56B ("9" and "16") in the processed string 36. The target word tokens 58 and/or associated start character offset index value 56A and end character offset index value 56B are sent to the original string target locator 60 of FIG. 1. Alternatively, the tokens 59A, 59B themselves may be sent to the original string target locator 60, for determination of the start character offset index value 56A and end character offset index value 56B.

The offset translation module 62 of the original string target locator 60 of the wordbreak algorithm program 42 converts the target word tokens 58 ("9" and "16") to the start character offset index value 64A and end character offset index value 64B of the target characters 74 ("5" and "13" in FIG. 1) of the original string 34 using the first data structure 50 and the second data structure 52 of the offset map 48. Two different steps using a second formula 84 and third formula 86 may be employed for this conversion to identify the start character offset index value 64A and end character offset index value 64B of the target characters 74 ("5" and "13" in FIG. 1).

First, the second formula 84 is utilized to determine a token index value 57 for each of the start character offset index value 56A of a start token 59A and end character offset index value 56B of an end token 59B of the target in the processed string 36 ("9" and "16" in FIG. 1). In the depicted example, the token index value 57 for the start character offset index value 56A ("9") is determined as "4" using the second formula 84, since the start character offset index value 56A ("9") is greater than or equal to the end character offset index value "(9)" of the fourth token [3] of the processed sting 36, and less than the end character offset index value "(15)" of the fifth token [4] of the processed string. The token index value 57 for the end character offset index value 56B ("16") is determined as "5" using the second formula 84, since the end character offset index value 56B ("16") is less than or equal to the end character offset index value "18" of the sixth token index [5] of the processed sting 36, and greater than the end character offset index value "15" of the fifth token [4]. Therefore, the token index values 57 for each of the start character offset index value 56A and end character offset index value 56B of the target 56 in the processed string 36 are "4" and "5" respectfully.

Finally, by incorporating the index values above ("4" and "5") into the third formula 86, a start character offset index value 64A of the start token 59A' in the original string 34 using the start character offset index value stored in the first data structure of the offset map 48, and an end character offset index value 64B of an end token 59B' using the end character offset index value stored in the second data structure of the offset map 48. In the depicted example, the start character offset index value of the start token in the original string 34 is "5", since the start character offset index value for the fifth token [4] is "5" of [4] (5, 5) in the original string 34. On the other hand, the end character offset index value of the end token is "13", since the start character offset index value for the sixth token [5] is "12" and its length is "2" in the original string 34, and "12"+"2"−"1"="13", as described in FIG. 3. As a result, the start character offset index value 64A and end character offset index value 64B of the target characters 74 are identified as (5, 13), and the corresponding target characters "passport ... number" (English translation) in the original string 34 are identified.

FIG. 6 illustrates shows a schematic view of a plurality of data structures manipulated by the computing system of FIG. 1, when performing a wordbreak algorithm with offset mapping on a different example of the original string 34. In this example, the original string 34 is written in Japanese, and an English translation of the original string is "a purchase history will soon be available only when you log in and will be centrally managed within my number card." Following the same procedure as described in FIG. 3 above, the target characters "number card" (an English translation of the Japanese target characters) of the original string 34 is identified using the offset map 48 of FIG. 1. In this example, the term "number card" has been entered into the sensitive data definition by an administrator and corresponding word tokens of the target 56 in the processed string 36 have been identified by the search program 54.

In the depicted example as described in FIG. 6, the offset map generator 46 of FIG. 1 obtains the first data structure 50 of [0](0, 2), [1](2, 2), [2](4, 1) . . . [20](42, 1) and [21](43, 2) from the original string 34, and obtains the second data structure 52 of [0](3), [1](6), [2](8) [20](63) and [21](66) from the processed string 36 using the first formula 83 to generate the offset map 48. Next, the search program 54 of FIG. 1 identifies the target 56 in the processed string 36 and the target word tokens 58 are determined. The target word tokens 58 also have an associated start character offset index value 56A and end character offset index value 56B ("42" and "52") in the processed string 36. Next, a token index value 57 ("14" and "16") for each of the start character offset index value 56A of a start token 59A and end character offset index value 56B of an end token 59B of the target 56 in the processed string 36 are obtained from the target word tokens 58 using the second formula 84. Finally, by incorporating the index values above ("14" and "16") into the third formula 86, the start character offset index value of the start token "28" in the original string 34 and the end character offset index value of the end token "36" are obtained. As a result, the start character offset index value 56A and end character offset index value 56B of (28, 36), and the corresponding target characters "within number card" (English translation) in the original string 34 are identified.

Figure 7:
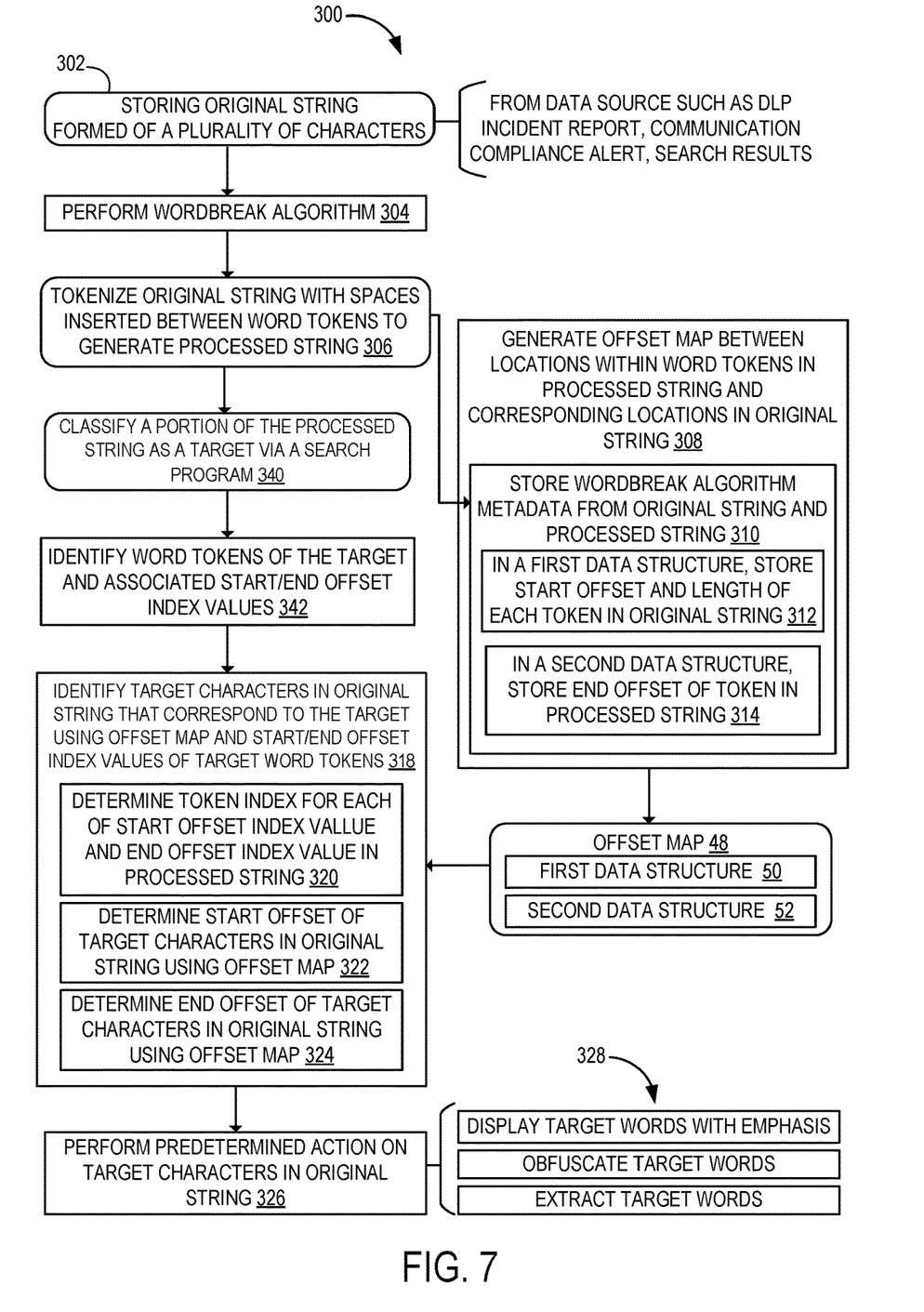
FIG. 7 shows a flowchart of a method according to one example implementation of the present disclosure.

FIG. 7 shows a flowchart of a computerized method 300 according to one example implementation of the present disclosure. At step 302, the computerized method 300 may include storing an original string formed of a plurality of characters. At step 304, the method may further include performing a wordbreak algorithm on the original string. At step 306, the method 300 may further include tokenizing the original string to generate a processed string including a plurality of word tokens separated by spaces. From step 306, the method branches into two parallel workflows. Following a first branch of the parallel workflow, at step 308, the method 300 may further include generating an offset map 48 between locations within the word tokens in the processed string and corresponding locations in the original string. At 310, the method may include storing wordbreak algorithm metadata from the original string and the processed string in a data structure. The metadata may be indicative of the location and length of the target in the original string and the processed string. For example, as indicated at 312, the offset map may include a first data structure, and the method may include storing a start character offset index value and character length in the original string in the first data structure, of each token word that is detected in the original string during the wordbreak algorithm. In addition or in the alternatively, as indicated at 314, the offset map may include a second data structure, and the method may include storing an end character offset index value of each token in the processed string. Returning to a second branch of the parallel workflow, at step 340, the method may further include classifying a portion of the processed string as a target via a search program. At step 342, the method 300 may further include identifying target word tokens and associated start character offset index value and end character offset index value.

At step 318, the method 300 may further include identifying target characters in the original string that correspond to the target using the offset map and the target word tokens and associated start character offset index value and end character offset index value. To identify the target characters, at 320, the method may include determining a token index value for each of the start character offset index value and end character offset index value of the target in the processed string. At 322, the method may further include determining a start character offset index value of the start token in the original string using the start character offset index value stored in the first data structure of the offset map. At 324, the method may include determining an end character offset index value of an end token using the end character offset index value stored in the second data structure of the offset map. Once the target characters are identified, at step 326, the method 300 may further include performing a predetermined action 328 on the target characters in the original string, including displaying target words with emphasis, obfuscating target words and/or extracting target words.

It will be appreciated that the systems and methods described above may be used with data sets including strings in multi-byte encoded languages, to search for target characters that match a sensitive data definition in a processed string that has been tokenized for optimized searching, and to identify corresponding characters in an original string from which the processed string was generated. With the corresponding characters identified in this manner, an appropriate action may be performed on the corresponding characters in the original string.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
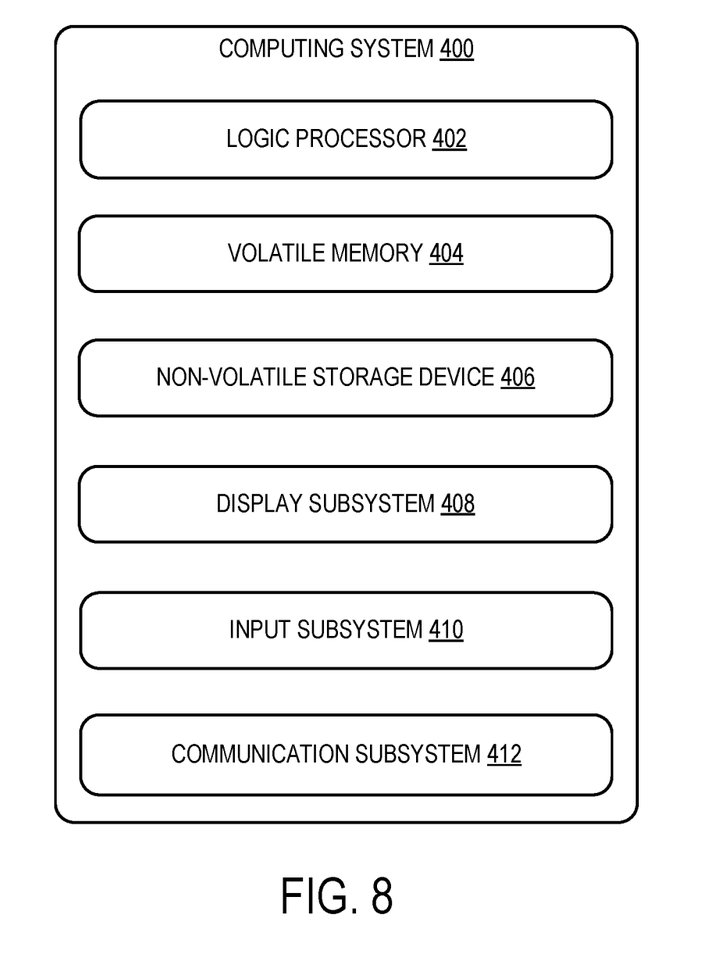
FIG. 8 shows a schematic view of an example computing environment in which the method of FIG. 1 may be enacted.

FIG. 8 schematically shows a non-limiting embodiment of a computing system 400 that can enact one or more of the methods and processes described above. Computing system 400 is shown in simplified form. Computing system 400 may embody the computer device 12 described above and illustrated in FIG. 1, and the various computing devices illustrated in FIG. 2. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 8.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computer system is provided. The computer system may include a processor coupled to a mass storage device that stores instructions, which, upon execution by the processor, cause the processor to store an original string formed of a plurality of characters. The processor may be further configured to perform a wordbreak algorithm on the original string. The processor may be further configured to tokenize the original string to generate a processed string including a plurality of word tokens separated by spaces. The processor may be further configured to generate an offset map between locations within the word tokens in the processed string and corresponding locations in the original string. The processor may be further configured to classify a portion of the processed string as a target. The processor may be further configured to identify target characters in the original string that correspond to the target using the offset map. The processor may be further configured to perform a predetermined action on the target characters in the original string.

According to this aspect, to perform the predetermined action, the processor may be further configured to display the target characters with emphasis, obfuscate the target characters, and/or extract the target characters.

According to this aspect, to identify the target characters in the original string, the processor may be further configured to identify a start character offset index value and character length of the target characters, and/or identify a start character offset index value and an end character offset index value of the target characters.

According to this aspect, to identify the target characters in the original string, the processor may be further configured to determine a start character offset index value and end character offset index value of the target in the processed string, determine a token index value for each of the start character offset index value and end character offset index value of the target in the processed string, determine a start character offset index value of the start token in the original string using the start character offset index value stored in the first data structure of the offset map, and determine an end character offset index value of an end token using the end character offset index value stored in the second data structure of the offset map.

According to this aspect, the target may be sensitive information of a predetermined sensitive information data type.

According to this aspect, the original string may include Japanese, Chinese, Korean or Thai language characters.

According to this aspect, the original string may be extracted from an electronic document or an electronic message.

According to this aspect, the original string may include characters that are omitted in the processed string after performing the wordbreak algorithm.

According to this aspect, the offset map may include a first data structure storing a start character offset index value and character length in the original string, of each token word that is detected in the original string during the wordbreak algorithm, and a second data structure storing an end character offset index value of each token in the processed string, where each of the first and second data structures has a same number of elements.

According to another aspect of the present disclosure, a computerized method is provided. The computerized method may include storing an original string formed of a plurality of characters. The computerized method may further include performing a wordbreak algorithm on the original string and tokenizing the original string to generate a processed string including a plurality of word tokens separated by spaces. The computerized method may further include generating an offset map between locations within the word tokens in the processed string and corresponding locations in the original string. The computerized method may further include classifying a portion of the processed string as a target. The computerized method may further include identifying target characters in the original string that correspond to the target using the offset map. The computerized method may further include performing a predetermined action on the target characters in the original string.

According to this aspect, performing a predetermined action may include one or more of displaying the target characters with emphasis, obfuscating the target characters, and/or extracting the target characters.

According to this aspect, identifying target characters in the original string may include one or more of identifying a start character offset index value and character length of the target characters, and/or identifying a start character offset index value and an end character offset index value of the target characters.

According to this aspect, identifying target characters in the original string may be accomplished at least in part by determining a start character offset index value and end character offset index value of the target in the processed string, determining a token index value for each of the start character offset index value and end character offset index value of the target in the processed string, determining a start character offset index value of the start token in the original string using the start character offset index value stored in the first data structure of the offset map, and determining an end character offset index value of an end token using the end character offset index value stored in the second data structure of the offset map.

According to this aspect, the target may be sensitive information of a predetermined sensitive information data type.

According to this aspect, the original string may include Japanese, Chinese, Korean or Thai language characters.

According to this aspect, the original string may be extracted from an electronic document or an electronic message.

According to this aspect, the original string may include characters that are omitted in the processed string after performing the wordbreak algorithm.

According to this aspect, the offset map may include a first data structure storing a start character offset index value and character length in the original string, of each token word that is detected in the original string during the wordbreak algorithm, and a second data structure storing an end character offset index value of each token in the processed string, where each of the first and second data structures has a same number of elements.

According to this aspect, the end character offset index value of each token in the processed string may be calculated using a prior end character offset index value of each token in the processed string and the length of a respective token in the original string.

According to another aspect of the present disclosure, a computer system configured to classify a word is provided. The computer system may include a server computing device configured to execute a search program, which is configured to receive as input sensitive data definitions and one or more policies, and to search a data set including a plurality of original strings for sensitive data according to the sensitive data definitions. The server computing device may be further configured to perform a wordbreak algorithm on a selected original string from the plurality of original strings. The server computing device may be further configured to tokenize the selected original string to generate a processed string including a plurality of word tokens separated by spaces. The server computing device may be further configured to generate an offset map between locations within word tokens in the processed string and corresponding locations in the original string. The server computing device may be further configured to classify a portion of the processed string as a target. The server computing device may be further configured to identify target characters in the original string that correspond to the target using the offset map. The server computing device may be further configured to perform a predetermined action on the target characters in the original string.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system, comprising:
a processor coupled to a mass storage device that stores instructions, which, upon execution by the processor, cause the processor to:
store an original string formed of a plurality of characters;
perform a wordbreak algorithm on the original string;
tokenize the original string to generate a processed string including a plurality of word tokens separated by one or more spaces;
generate an offset map between locations within the word tokens in the processed string and corresponding locations in the original string, the offset map including a mapping between a first data structure including character offset index values in the original string and a second data structure including character offset index values in the processed string;
classify a portion of the processed string as a target by determining a start character offset index value and end character offset index value of the target in the processed string from among the character offset index values in the second data structure;
identify target characters in the original string that correspond to the target using the mapping between the character offset values in the first and second data structures in the offset map; and
perform a predetermined action on the target characters in the original string.

2. The computer system of claim 1, wherein, to perform the predetermined action, the processor is configured to:
display the target characters with emphasis;
obfuscate the target characters; and/or
extract the target characters.

3. The computer system of claim 1, wherein, to identify the target characters in the original string, the processor is configured to:
identify a start character offset index value and character length of the target characters; and/or
identify the start character offset index value and an end character offset index value of the target characters.

4. The computer system of claim 1, wherein, to identify target characters in the original string, the processor is configured to:
determine a token index value for each of the start character offset index value and end character offset index value of the target in the processed string;
determine a start character offset index value of the start token in the original string using the start character offset index value stored in the first data structure of the offset map; and determine an end character offset index value of an end token using the end character offset index value stored in the second data structure of the offset map.

5. The computer system of claim 1, wherein the target is sensitive information of a predetermined sensitive information data type.

6. The computer system of claim 1, wherein the original string includes Japanese, Chinese, Korean or Thai language characters.

7. The computer system of claim 1, wherein the original string is extracted from an electronic document or an electronic message.

8. The computer system of claim 1, wherein the original string includes characters that are omitted in the processed string after performing the wordbreak algorithm.

9. The computer system of claim 1, wherein
the first data structure stores the start character offset index value and character length, in the original string, of each token word that is detected in the original string during the wordbreak algorithm; and
the second data structure stores the end character offset index value of each token in the processed string;
each of the first and second data structures has a same number of elements.

10. A computerized method, comprising:
storing an original string formed of a plurality of characters;
performing a wordbreak algorithm on the original string;
tokenizing the original string to generate a processed string including a plurality of word tokens separated by one or more spaces;
generating an offset map between locations within the word tokens in the processed string and corresponding locations in the original string, the offset map including a mapping between a first data structure including character offset index values in the original string and a second data structure including character offset index values in the processed string;
classifying a portion of the processed string as a target by determining a start character offset index value and end character offset index value of the target in the processed string from among the character offset index values in the second data structure;
identifying target characters in the original string that correspond to the target using the mapping between the character offset values in the first and second data structures in the offset map; and
performing a predetermined action on the target characters in the original string.

11. The computerized method of claim 10, wherein performing a predetermined action includes one or more of:
displaying the target characters with emphasis;
obfuscating the target characters; and/or
extracting the target characters.

12. The computerized method of claim 10, wherein identifying target characters in the original string includes one or more of:
identifying a start character offset index value and character length of the target characters; and/or
identifying the start character offset index value and an end character offset index value of the target characters.

13. The computerized method of claim 10, wherein identifying target characters in the original string is accomplished at least in part by:
determining a token index value for each of the start character offset index value and end character offset index value of the target in the processed string;

determining a start character offset index value of the start token in the original string using the start character offset index value stored in the first data structure of the offset map; and determining an end character offset index value of an end token using the end character offset index value stored in the second data structure of the offset map.

14. The computerized method of claim 10, wherein the target is sensitive information of a predetermined sensitive information data type.

15. The computerized method of claim 10, wherein the original string includes Japanese, Chinese, Korean or Thai language characters.

16. The computerized method of claim 10, wherein the original string is extracted from an electronic document or an electronic message.

17. The computerized method of claim 10, wherein the original string includes characters that are omitted in the processed string after performing the wordbreak algorithm.

18. The computerized method of claim 10, wherein the first data structure stores the start character offset index value and character length, in the original string, of each token word that is detected in the original string during the wordbreak algorithm; and the second data structure stores the end character offset index value of each token in the processed string;

each of the first and second data structures has a same number of elements.

19. The computerized method of claim 18, wherein the end character offset index value of each token in the processed string is calculated using a prior end character offset index value of each token in the processed string and the length of a respective token in the original string.

20. A computer system configured to classify a word, comprising:

a server computing device configured to execute a search program, the search program being configured to receive as input sensitive data definitions and one or more policies, and to search a data set including a plurality of original strings for sensitive data according to the sensitive data definitions, wherein the server computing device is configured to:

perform a wordbreak algorithm on a selected original string from the plurality of original strings;

tokenize the selected original string to generate a processed string including a plurality of word tokens separated by one or more spaces;

generate an offset map between locations within word tokens in the processed string and corresponding locations in the original string, the offset map including a mapping between a first data structure including character offset index values in the original string and a second data structure including character offset index values in the processed string;

classify a portion of the processed string as a target by determining a start character offset index value and end character offset index value of the target in the processed string from among the character offset index values in the second data structure;

identify target characters in the original string that correspond to the target using the mapping between the character offset values in the first and second data structures in the offset map; and perform a predetermined action on the target characters in the original string.

\* \* \* \* \*